United States Patent
Jeong

(10) Patent No.: US 6,743,347 B2
(45) Date of Patent: Jun. 1, 2004

(54) BEARING MANUFACTURING METHOD FOR COMPRESSOR

(75) Inventor: Chan Hwa Jeong, Changwon (KR)

(73) Assignee: LG Electronics Inc. (KR)

(*) Notice: Subject to any disclaimer, the term of this patent is extended or adjusted under 35 U.S.C. 154(b) by 121 days.

(21) Appl. No.: 10/015,253

(22) Filed: Dec. 12, 2001

(65) Prior Publication Data

US 2002/0083589 A1 Jul. 4, 2002

(30) Foreign Application Priority Data

Dec. 29, 2000 (KR) .......................... 2000-85796

(51) Int. Cl.⁷ ............................... C25D 11/00
(52) U.S. Cl. ................. 205/333; 205/323; 205/324
(58) Field of Search .................. 205/333, 323, 205/324

(56) References Cited

U.S. PATENT DOCUMENTS

| | | |
|---|---|---|
| 3,540,862 A | 11/1970 | Roemer |
| 4,230,539 A | 10/1980 | Saruwatari |
| 4,861,440 A | 8/1989 | Covino |
| 5,139,449 A | 8/1992 | Akahori |

FOREIGN PATENT DOCUMENTS

| | | |
|---|---|---|
| JP | 56044796 | 4/1981 |
| JP | 56130489 | 10/1981 |
| JP | 56136997 | 10/1981 |

OTHER PUBLICATIONS

German Search Report dated May 29, 2002 of Application EP 01130181.

Primary Examiner—Wesley A. Nicolas
(74) Attorney, Agent, or Firm—Osterolenk, Faber, Gerb & Soffen, LLP

(57) ABSTRACT

A bearing manufacturing method for a compressor is disclosed. Since an oxide-coated layer is formed at the surface of the bearing and electrolized in a tiomolybedenic acid ammonium aqueous solution so that the molybedene emulsion can be infiltrated in the fine pores of the oxide-coated layer. Accordingly, the abrasion resistance of the bearing can be increased while the friction coefficient is remarkably reduced, and thus, a reliability of the compressor and an energy efficiency can be increased.

4 Claims, 2 Drawing Sheets

BEARING MANUFACTURING METHOD FOR COMPRESSOR

BACKGROUND OF THE INVENTION

1. Field of the Invention

The present invention relates to a bearing manufacturing method for a compressor, and more particularly to a compressor bearing manufacturing method that is capable of improving a reliability of a compressor and improving an energy efficiency by increasing an abrasion resistance and reducing a friction coefficient.

2. Description of the Background Art

In general, as shown in FIG. 1, a compressor includes a casing 6 to which a suction tube 2 for sucking a coolant and a discharge tube 4 for discharging a compressed coolant are respectively connected, a drive unit 8 being disposed at a lower side of the casing 6 and generating a driving force, a rotational shaft 14 being rotated upon receipt of a rotational force generated by the drive unit 8, and a compressing unit 16 for being connected to an upper side of the rotational shaft 14 and compressing fluid upon receipt of the rotational force of the rotational shaft 14.

The drive unit 8 includes a stator 10 fixed in the circumferential direction of the casing 6 and a rotor 12 being disposed at certain distance at an inner circumferential surface of the stator 10, being rotated by an interaction with the stator 10, and being connected to the rotational shaft 14.

The compressing unit 16 includes a fixed scroll 28 having fixed wings 26 in an involute shape and fixed at an upper side of the casing 6, and a revolving scroll 32 having revolving wings 30 disposed at a certain distance from their respective fixed wings 26 to form a compressed space therebetween.

An upper frame 18 is installed at an upper portion of the casing 6 to support the upper portion of the rotational shaft 14 and supporting the compression unit 16, and a lower frame 20 is installed at a lower portion of the casing 6 to support the lower portion of the rotational shaft 14.

An upper bearing 22 is inserted between the upper frame 18 and the rotational shaft 14 to rotatably support the upper side of the rotational shaft 14, and a lower bearing 24 is inserted between the lower frame 20 and the rotational shaft 14 to rotatably support the lower side of the rotational shaft 14.

The upper and the lower bearings 22 and 24 should have an abrasion resistance so as to be used at a high load and at a high speed for a long period of time and should minimize an energy loss when the rotational shaft is rotatably moved.

The conventional bearing is a bearing which forms a copper lead powder sintered layer or a bearing of a type that a teflon is coated on an aluminum alloy material, copper lead powder sintered layer or aluminum alloy material.

However, the conventional compressor bearing manufactured as described above has the following problems.

That is, though it can satisfy the performance required for a compressor which uses a coolant of chlorofluorocarbon (CFC) group which is typically used as a coolant, if it uses a coolant of hydrofluorocarbon (HFC) group, an environment-friendly coolant, a greater abrasion resistance and less friction coefficient are required than the case where the chlorofluorocarbon (CFC) group coolant is used, resulting in that the compressor is not suitable to use the hydrate fluoride carbon (HFC).

In addition, in case that the bearing made by coating teflon on copper lead or an aluminum alloy is adopted to a compressor which uses the hydrofluorocarbon (HFC) group coolant, since the thickness of the teflon coated layer is hardly precisely manufactured, it is impossible to process for improving an inner diameter form of the bearing or the illumination of the surface of the bearing, resulting in that a gap is created between the bearing and the rotational shaft, which inevitably causes a vibration and noise. Then, the friction amount is relatively increased and the performance of the compressor is considerably degraded.

SUMMARY OF THE INVENTION

Therefore, an object of the present invention is to provide a bearing manufacturing method for a compressor that is capable of improving a reliability of a compressor and improving an energy efficiency by increasing an abrasion resistance and a friction coefficient for a compressor which uses a hydrofluorocarbon (HFC) is used as a coolant according to the tendency of using an environment-friendly coolant.

To achieve these and other advantages and in accordance with the purpose of the present invention, as embodied and broadly described herein, there is provided a bearing manufacturing method for a compressor including the steps of: molding an exterior of a bearing by using an aluminum (Al) material; forming an oxide-coated layer on the surface of the bearing member after the exterior of the bearing is completed; and electrolizing the bearing in tiomolybdenic acid ammonium solution and infiltrating a molybedene emulsion into the oxide-coated layer of the bearing.

In the bearing manufacturing method for a compressor of the present invention, in the second step of forming the oxide-coated film, electrolyte solution such as sulfuric acid ($H_2SO_4$) and oxalic acid is set as a cathode and a material to be coated is set as an anode, to which electric current is provided to generate an oxide-coated layer on the surface of the material.

In the bearing manufacturing method for a compressor of the present invention, in the third step, the bearing with the oxide-coated film formed is electrolized in 0.01~0.1 wt % pure tiomolybdenic ammonium aqueous solution and hydrogen ion discharged from a barrier layer of the oxide-coated layer and molybdenesulfide ion dissociated from the tiomolybdenic acid ammonium aqueous solution are interacted in each fine pores, so that molybedene emulsion can be deposited in the pores.

In the bearing manufacturing method for a compressor of the present invention, in the third step, the oxide-coated film has the thickness of 0.01~0.03 mm.

The bearing manufacturing method for a compressor of the present invention further includes abrading a bearing contact face to improve the illumination of the surface of the bearing after infiltrating the molybedene emulsion.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

There may be a plurality of embodiments for a bearing manufacturing method for a compressor in accordance with the present invention, of which a preferred embodiment will now be described.

Figure 1:
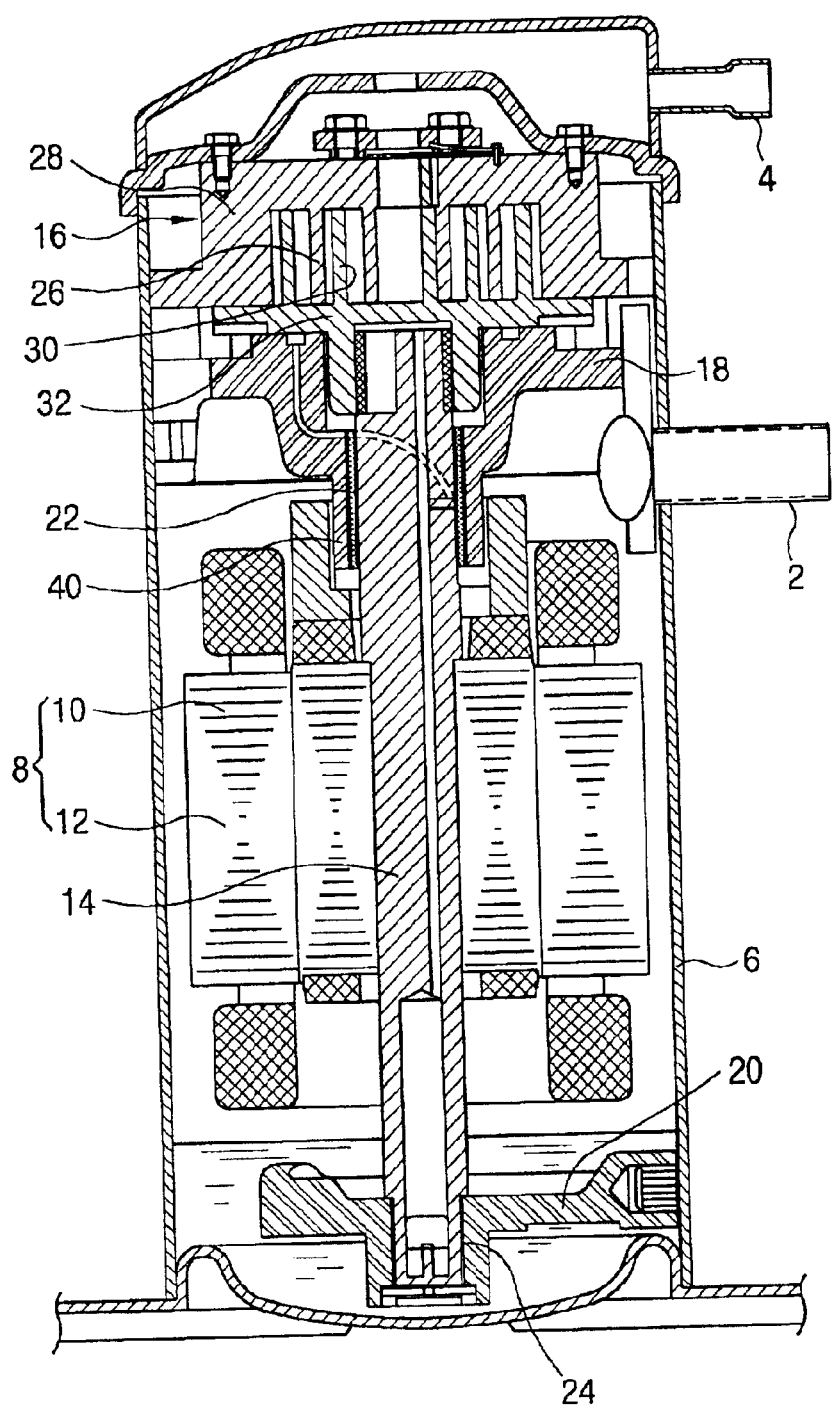
FIG. 1 is a sectional view of a general compressor.

FIG. 1 is a sectional view of a general compressor.

As shown in FIG. 1, a compressor of the present invention includes a hermetic casing 6 to which a suction tube 2 and a discharge tube 2 are connected; a drive unit 8 for being disposed at a lower side of the casing 6, a rotational shift 14 for being rotated upon receipt of a rotational force generated from the drive unit 8; and a compression unit 16 for being connected to the upper side of the rotational shaft 14 and compressing a fluid upon receipt of the rotational force of the rotational shaft 14.

The compressor uses a coolant of a hydrofluorocarbon (HFC) group.

An upper frame 18 is installed at an upper portion of the casing 6 to support the compression unit 16 as well as the upper portion of the rotational shaft 14, and a lower frame 20 is installed at a lower portion of the casing 6 to support the lower portion of the rotational shaft 14.

The upper frame 18 includes a through hole into which the rotational shaft penetrates, and an upper bearing 22 is inserted in the through hole to rotatably support the rotational shaft.

A support hole 40 is formed at the lower frame 20 to support the lower side of the rotational shaft, and a lower bearing 24 is inserted in the inner circumferential surface of the support hole 40 to rotatably support the rotational shaft 14.

Since such a compressor which uses a coolant of a hydrofluorocarbon (HFC) group requires a great abrasion resistance and a small friction coefficient for the upper bearing 22 and the lower bearing 24.

Thus, a bearing manufacturing method for improving an abrasion resistance and a lubricating ability will now be described.

Figure 2:
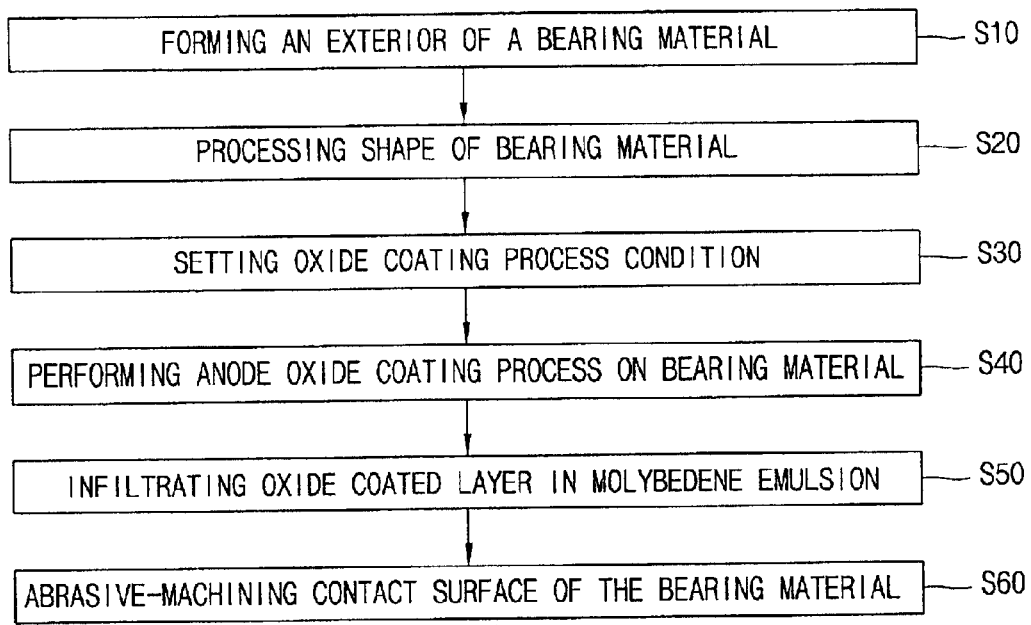
FIG. 2 is a flow chart of a sequential process of a bearing manufacturing method for a compressor in accordance with a preferred embodiment of the present invention.
Figure 3:
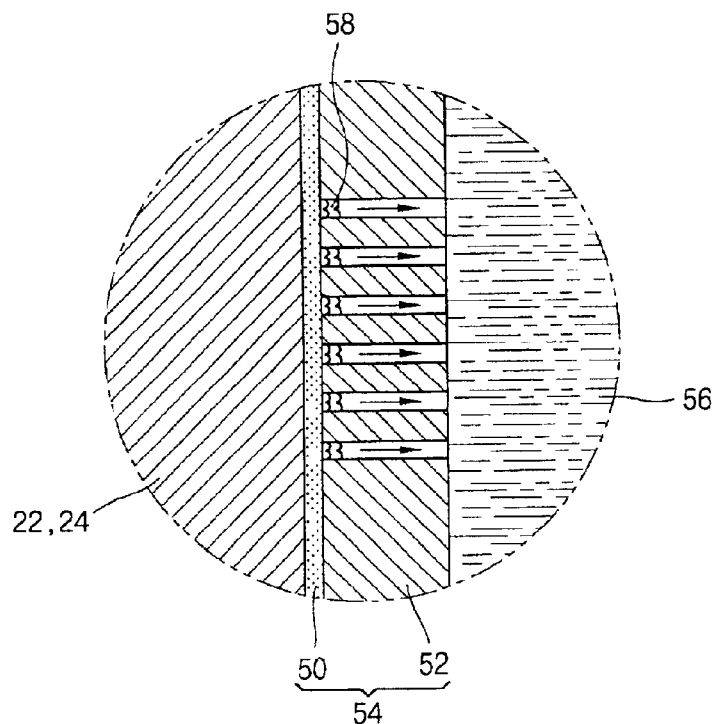
FIG. 3 is a partially enlarged sectional view showing the bearing manufacturing method for a compressor in accordance with the preferred embodiment of the present invention.

FIG. 2 is a flow chart of a sequential process of a bearing manufacturing method for a compressor in accordance with a preferred embodiment of the present invention, and FIG. 3 is a partially enlarged sectional view showing the bearing manufacturing method for a compressor in accordance with the preferred embodiment of the present invention.

First, an exterior of the bearings 22 and 24 are molded with an aluminum (Al) material according to a use portion such as the upper bearing 22 and the lower bearing 24 by using a dicasting method (step S10).

Next, the shape of the bearing is processed at a contact face where the bearing is contacted with the rotational shaft 14 and makes a relative motion by a turning method so as to heighten a form precision (step S20).

After the form processing of the bearings 22 and 24 is completed, a oxide-coated processing condition for forming a hard oxide-coated layer 54 at the surface of the bearings 22 and 24 is set (step S30).

For the oxide film coating process conditions, a voltage, a current and a temperature are set so that an oxide-coated film 54 having a thickness of 0.01~0.03 mm can be formed at the surface of the bearings 22 and 24.

In this respect, the thickness of the oxide-coated layer is set in consideration of a tolerance in the abrasion process in case that the abrasion process is to be performed to improve the surface illumination of the contact surface after the processing of the oxide-coated layer.

After the condition for the process of oxide coating is completed, an anode oxide coating is performed on the bearing (step S40).

The anodizing method is a coating method that the electrolyte solution such as sulfuric acid ($H_2SO_4$) and oxalic acid is set as a cathode and a material to be coated is set as an anode, to which electric current is provided so as to generate an oxide-coated layer at the surface of the material.

In detail, a material to be coated among en electrolyte solution at a temperature of 0~10° C. is set as a cathode and a material to be coated is set as an anode, to which a voltage of 20V is applied. After a certain time period elapses, when the thickness of the coated film is increased, the voltage is increased up to 180V. In this manner, when about 60 minutes are elapsed while gradually increasing the voltage, an oxide-coated layer with a certain thickness is formed at the surface of the material.

The bearings 22 and 24 undergoes an anode electric current providing process at an oxide coating container, an oxide-coated layer 54 is formed at the surface of the bearing as shown in below formula (1):

$$2Al + 3H_2O \rightarrow Al_2O_3 + 6H^+ + 6e^- \tag{1}$$

The oxide-coated layer 54 formed at the surface of the bearing includes a barrier layer 50 and a porous layer 52 which are stacked.

The bearing with the oxide-coated layer 54 is infiltrated in the molybedene emulsion (step S50).

That is, the bearings 22 and 24 having the oxide-coated layer 54 thereon is electrolyzed in 0.01~0.1 wt % pure tiomolybedenic acid ammonium aqueous solution 56.

Then, the hydrogen ion discharged from the barrier layer 50 of the oxide-coated layer and molybedene sulfide ion dissociated from the tiomolybedenic acid ammonium aqueous solution 56 are interacted in each fine pore of the porous layer 52 of the oxide-coated layer in the tiomolybedenic acid ammonium aqueous solution 56, so that molybedene emulsion 58 starts to be deposited at the bottom portion of the pores, as shown in formulas (2), (3a) and (3b):

$$(NH_4)_2MoS_4 \rightarrow 2NH_4^+ + MoS_4^{-2} \tag{2}$$

$$MoS_4^{-2} + 2H \rightarrow MoS_3 + H_2S \tag{3a}$$

$$MoS_3 \rightarrow MoS_2 + S \tag{3b}$$

As shown in FIG. 3, the deposited molybedene emulsion 58 is grown in the surface direction, increasing an abrasion resistance of the bearings 22 and 24 while considerably reducing a friction coefficient.

After the molybedene emulsion according to the secondary electrolyte of the bearings 22 and 24 is completed, if the oxide-coated layer 54 is comparatively formed thin by 0.01~0.03 mm at the surface of the bearing, the surface of the bearing is used as it is rather than abrasive machining. Meanwhile, if the abrasive machining is required, it is performed on the contact surface.

As so far described, the bearing manufacturing method for a compressor of the present invention has the following advantages.

That is, for example, since the oxide-coated layer is formed at the surface of the bearing and electrolized in a tiomolybedenic acid ammonium aqueous solution so that the molybedene emulsion can be infiltrated in the fine pores of the oxide-coated layer. Accordingly, the abrasion resistance of the bearing can be increased while the friction coefficient is remarkably reduced, and thus, a reliability of the compressor and an energy efficiency can be increased.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A bearing manufacturing method for a compressor comprising the steps of:

molding an exterior of a bearing by using an aluminum (Al) material;

forming an oxide-coated layer on the surface of the bearing member by an electrolyte solution selected from the group consisting of sulfuric acid ($H_2SO_4$) and oxalic acid, wherein said electrolyte solution is set as a cathode, and a material to be coated is set as an anode, to which electric current is provided to generate an oxide-coated layer on the surface of the material after the exterior of the bearing is completed; and electrolizing the bearing in ammonium thiomolybdate and infiltrating a molybedene emulsion into the oxide-coated layer of the bearing.

2. The method of claim 1, wherein, in the third step, the bearing with the oxide-coated film formed is electrolized in 0.01~0.1 wt % pure ammonium thiomolybdate aqueous solution and hydrogen ion discharged from a barrier layer of the oxide-coated layer and molybdenesolfide ion dissociated from the ammonium thiomolybdate aqueous solution are interacted in each fine pores, so that molybedene emulsion can be deposited in the pores.

3. The method of claim 1, wherein, in the third step, the oxide-coated film has the thickness of 0.01~0.03 mm.

4. The method of claim 1, further comprising a step of abrading a bearing contact face to improve the illumination of the surface of the bearing after infiltrating the molybedene emulsion.

* * * * *